(12) United States Patent
Casebier

(10) Patent No.: US 9,015,904 B2
(45) Date of Patent: Apr. 28, 2015

(54) UNIVERSAL VALVE DEVICE

(71) Applicant: Daniel W. Casebier, Austin, TX (US)

(72) Inventor: Daniel W. Casebier, Austin, TX (US)

( * ) Notice: Subject to any disclaimer, the term of this patent is extended or adjusted under 35 U.S.C. 154(b) by 0 days.

(21) Appl. No.: 13/896,067

(22) Filed: May 16, 2013

(65) Prior Publication Data

US 2014/0339451 A1  Nov. 20, 2014

(51) Int. Cl.
*F16K 31/60* (2006.01)
(52) U.S. Cl.
CPC .............. *F16K 31/60* (2013.01); *F16K 31/607* (2013.01); *Y10S 16/24* (2013.01); *Y10T 16/4713* (2015.01); *Y10T 24/1439* (2015.01); *Y10S 16/25* (2013.01); *Y10T 16/469* (2015.01)
(58) Field of Classification Search
CPC .............. Y10T 16/469; Y10T 16/4713; Y10T 24/1439; Y10S 16/24; Y10S 16/25; F16K 31/60; F16K 31/602; F16K 31/605; F16K 31/607
USPC ...... 16/422, 426, DIG. 24, DIG. 25; 251/291, 251/292; 269/45, 3, 6, 95, 71, 53
See application file for complete search history.

(56) References Cited

U.S. PATENT DOCUMENTS

| | | | | |
|---|---|---|---|---|
| 1,687,382 A * | 10/1928 | North | ............... | 82/172 |
| 1,878,569 A * | 9/1932 | Zolleis | ............... | 74/548 |
| 2,043,418 A * | 6/1936 | Newmark | ............... | 403/3 |
| 2,047,704 A * | 7/1936 | Podolsky | ............... | 403/354 |
| 2,098,515 A | 11/1937 | Pardieck | | |
| 2,421,140 A * | 5/1947 | Blaner | ............... | 248/527 |
| 2,763,454 A * | 9/1956 | Lindsell | ............... | 248/517 |
| 2,797,941 A * | 7/1957 | Manning et al. | ............... | 403/350 |
| 2,905,414 A * | 9/1959 | Zierden | ............... | 47/40.5 |
| 2,933,274 A * | 4/1960 | Mausolf | ............... | 47/40.5 |
| 3,017,150 A * | 1/1962 | Kahle | ............... | 248/522 |
| 3,116,096 A * | 12/1963 | Kavanagh | ............... | 312/204 |
| 3,384,339 A * | 5/1968 | Cornell, III | ............... | 251/291 |
| 3,469,342 A * | 9/1969 | Morris | ............... | 47/79 |
| 4,445,529 A * | 5/1984 | Lagarelli | ............... | 137/360 |
| 4,796,348 A | 1/1989 | Rosen | | |
| 4,842,009 A | 6/1989 | Reback | | |
| 4,998,321 A * | 3/1991 | Gaffney et al. | ............... | 16/110.1 |
| 4,999,875 A | 3/1991 | Rybak | | |
| 5,025,826 A | 6/1991 | Schoepe | | |
| 5,671,904 A | 9/1997 | Minutillo | | |
| 5,735,456 A * | 4/1998 | Marin et al. | ............... | 236/75 |
| D462,111 S | 8/2002 | Turnau, III et al. | | |
| D472,962 S | 4/2003 | Tripp et al. | | |
| 2007/0180611 A1 | 8/2007 | Rhoda | | |
| 2009/0250647 A1 | 10/2009 | Anderson | | |
| 2010/0147407 A1 | 6/2010 | Rosko | | |
| 2011/0180155 A1* | 7/2011 | Shantzis | ............... | 137/315.15 |

\* cited by examiner

*Primary Examiner* — Jeffrey O Brien

(57) ABSTRACT

Embodiments are directed to an adjustable universal valve handle.

6 Claims, 2 Drawing Sheets

UNIVERSAL VALVE DEVICE

Certain embodiments are directed to adjustable universal valve handles used in controlling valves, particularly plumbing valves.

SUMMARY

Certain embodiments are directed to a valve handle comprising: a base having a top, a bottom, at least one side; the base forming a lumen along the axis perpendicular to the top and bottom of the base, wherein the lumen accepts a valve stem; and at least two anchors having a proximal end positioned within the lumen of the base and a distal end that is positioned external to the base, the anchor extend radially from a perpendicular axis and in a plane between the top and the bottom of the base, wherein the anchors are configured to be adjusted for securing a valve stem that is positioned within the lumen of the base. The anchors pass through holes formed in the outer side and inner side walls of the base. In certain aspects the portion of the base through which the anchors pass and the anchor are threaded. The outer circumference of the base can have a circular or polygonal shape. The inner circumference defining the lumen of the base can have a circular or polygonal shape. The outer circumference and inner circumference need not have the same the shape. In certain aspects the outer circumference and inner circumference have the same shape. In certain aspects the base has a triagonal, square, pentagonal, or hexagonal outer circumference. In a further aspect the base has a triagonal, square, pentagonal, or hexagonal inner circumference. In certain aspects the base is metal or plastic.

In certain aspects the handle comprises two, three, four, five or more anchors. In certain aspects the handle has three anchors. The anchors are configured to be adjustable so as to secure a valve stem, in one example the anchors are threaded so that they screw through the base to secure a valve stem. In certain aspects the anchors can include, but is not limited to a slot, a hex socket, a hexalobular, a TTAP, a philips, a bristol, a clutch, a claw, a double hex, a line, a pentalobe, a polydrive, a spanner, a spline, a torq-set, a TA, a TP3, a tri-wing, a triple square, a mortorq, a frearson, a posidrive, or a scrulox head at the distal end. In certain aspects the anchors have a grip at the proximal end configured to engage and secure the valve stem. The grip can be a series of grooves, a beveled edge, or a complementing edge. In certain aspects the handle has a cap covering the lumen on the top of the base. The cap can be configured to act as a stop for a stem traversing the lumen of the base.

In certain aspects the inner diameter of the base is about, at most, or at least 5, 10, 20, 30, 40, 50, 60, 70, 80, 90, 100 or more millimeters, including all values and ranges there between. The outer diameter of the base is about, at most or at least 6, 10, 20, 30, 40, 50, 60, 70, 80, 90, 100 or more millimeters, including all values and ranges there between.

Other embodiments of the invention are discussed throughout this application. Any embodiment discussed with respect to one aspect applies to other aspects as well and vice versa. Each embodiment described herein is understood to be embodiments that are applicable to all aspects of the invention. It is contemplated that any embodiment discussed herein can be implemented with respect to any method or device of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Figure 1:
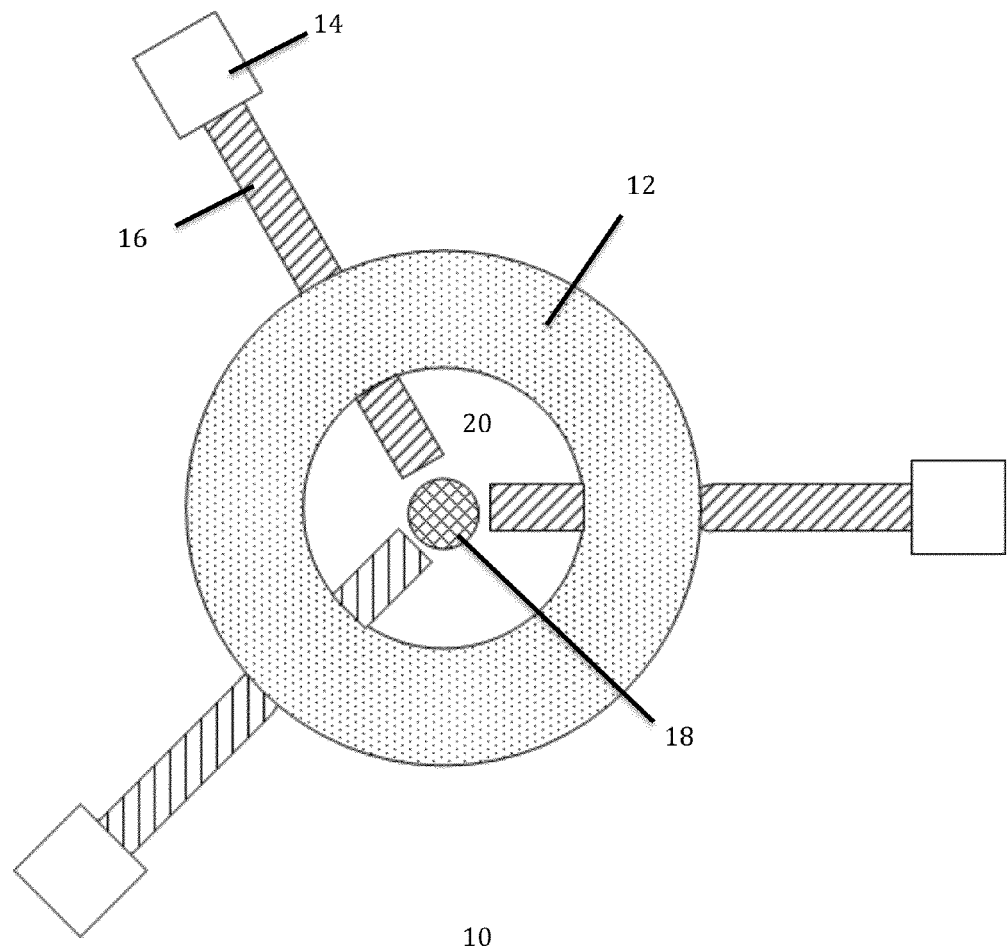
FIG. 1 illustrates a top view of a universal valve handle.

FIG. 1 illustrates one embodiment of universal valve handle 10. Handle 10 comprises base 12 and anchors 16. The base forms lumen 20 that is configured to accept valve stem 18. Valve stem 18 is secured by adjusting anchors 16. Anchors 16 can be adjusted using head 14. In certain aspects head 14 is configured to adjust by hand or by the use of a driver or tool. Head 14 can have a slot, a hex socket, a hexalobular, a TTAP, a philips, a bristol, a clutch, a claw, a double hex, a line, a pentalobe, a polydrive, a spanner, a spline, a torq-set, a TA, a TP3, a tri-wing, a triple square, a mortorq, a frearson, a posidrive, or a scrulox head configuration. In other aspects the head can be a triangle, square, pentagon, hexagon, or the like. Anchor 16 can be threaded.

Figure 2:
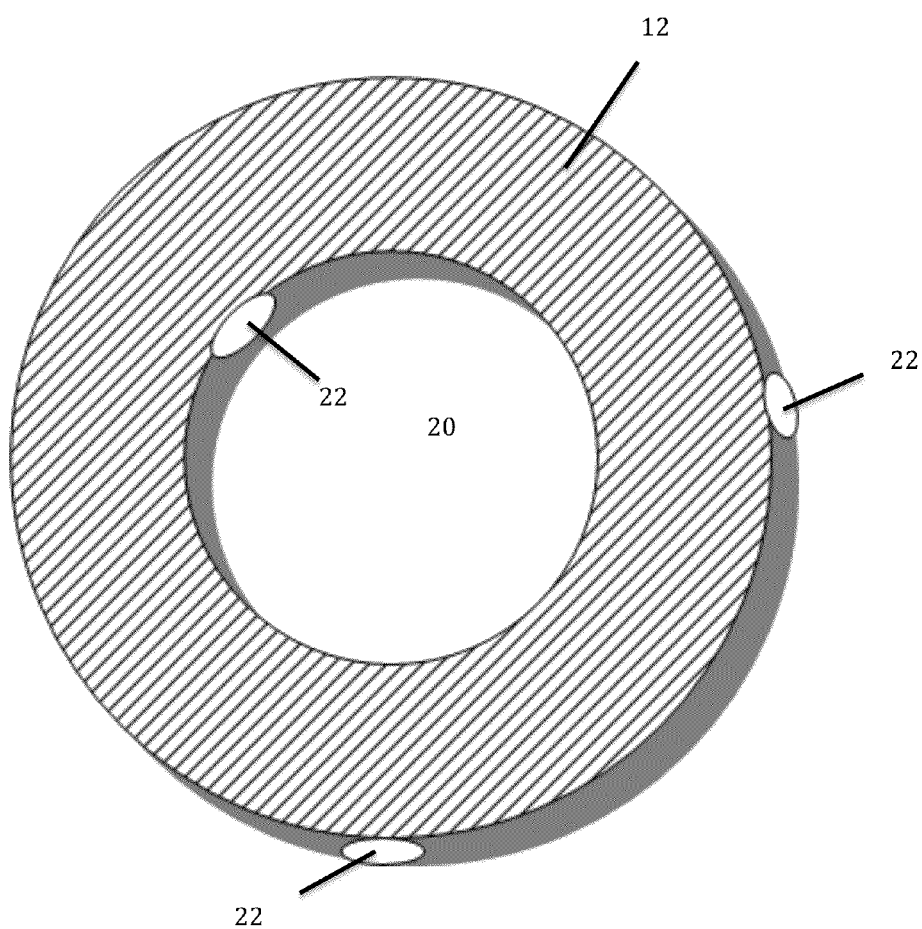
FIG. 2 illustrates a perspective view of the base of the valve handle.

FIG. 2 illustrates base 12 forming lumen 20 and anchor access openings 22. Anchor 16 accesses lumen 20 via anchor access openings 22. The walls of opening 22 can be threaded to complement a threaded anchor 16. There will be at least as many openings as there are anchors for a given configuration.

A stem can have any of a number of shapes including circular, grooved, square, rectangle, regular polygon, or irregular polygon. Anchors 16 can be configured to accept and secure such shapes. In certain aspects the end of anchor 16 distal to head 14 can be grooved, beveled or shaped to complement a given valve stem. In certain aspect the anchor is grooved on the tip.

The invention claimed is:

1. A universal valve handle comprising:
   a base having a top, a bottom, at least one side, and a lumen along an axis perpendicular to the top and bottom of the base, wherein the lumen accepts a valve stem;
   at least two anchors having a proximal end positioned within the lumen of the base and a distal end that is positioned external to the base forming the universal valve handle, the distal portion of the at least two anchors extend from the axis perpendicular to the top and bottom of the base and in a plane between the top and the bottom of the base, wherein the at least two anchors are configured to be adjusted for securing a valve stem that is positioned within the lumen of the base and for turning the valve stem.

2. The handle of claim 1, wherein the base is circular or polygonal in shape.

3. The handle of claim 1, wherein the base is metal or plastic.

4. The handle of claim 1, wherein the handle comprises three anchors.

5. The handle of claim 1, wherein the anchors are screws.

6. The handle of claim 5, wherein the anchors have a hex head at the distal end.

* * * * *